(12) United States Patent
Morrissey et al.

(10) Patent No.: US 9,444,633 B2
(45) Date of Patent: *Sep. 13, 2016

(54) METHOD AND APPARATUS FOR PROVIDING POWER OVER A DATA NETWORK

(75) Inventors: Michael P. Morrissey, Overland Park, KS (US); Mohit Mathur, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1329 days.

This patent is subject to a terminal disclaimer.

(21) Appl. No.: 11/824,069

(22) Filed: Jun. 29, 2007

(65) Prior Publication Data

US 2009/0003374 A1    Jan. 1, 2009

(51) Int. Cl.
*H04L 12/66* (2006.01)
*H04L 12/10* (2006.01)

(52) U.S. Cl.
CPC ..................... *H04L 12/10* (2013.01)

(58) Field of Classification Search
USPC ........................................................ 713/300
See application file for complete search history.

(56) References Cited

U.S. PATENT DOCUMENTS

| | | | |
|---|---|---|---|
| 6,081,533 A | 6/2000 | Laubach et al. | |
| 6,285,685 B1 | 9/2001 | Bum | |
| 6,448,899 B1 * | 9/2002 | Thompson | 340/815.4 |
| 6,466,573 B1 | 10/2002 | Renucci | |
| 6,493,875 B1 | 12/2002 | Eames et al. | |
| 6,526,581 B1 | 2/2003 | Edson | |
| 6,535,983 B1 * | 3/2003 | McCormack et al. | 713/310 |
| 6,640,239 B1 | 10/2003 | Gidwani | |
| 6,640,308 B1 * | 10/2003 | Keyghobad et al. | 713/300 |
| 6,640,335 B2 | 10/2003 | Ebisawa | |
| 6,678,362 B2 | 1/2004 | Hong et al. | |
| 6,791,993 B2 | 9/2004 | Foley | |
| 6,986,071 B2 * | 1/2006 | Darshan et al. | 713/330 |
| 7,139,283 B2 | 11/2006 | Quigley et al. | |
| 7,154,381 B2 * | 12/2006 | Lang et al. | 340/310.11 |
| 7,324,542 B2 | 1/2008 | Furlong et al. | |
| 7,489,849 B2 | 2/2009 | Reagan et al. | |
| 7,505,748 B2 * | 3/2009 | McCarthy et al. | 455/249.1 |
| 7,620,846 B2 | 11/2009 | Biederman et al. | |
| 8,755,265 B2 | 6/2014 | Morrissey et al. | |
| 2001/0000826 A1 | 5/2001 | Bellamy | |

(Continued)

OTHER PUBLICATIONS

IEEE Standard 802.3af-2003, Jun. 18, 2003.*

(Continued)

*Primary Examiner* — Steven H Nguyen
(74) *Attorney, Agent, or Firm* — Swanson & Bratschun, L.L.C.

(57) ABSTRACT

A method, apparatus, and computer usable program product for providing power over Ethernet are provided in the illustrative embodiments. The apparatus and method for providing power over Ethernet includes a first device that receives power from a computer. A second device may be in communication with the first device using a wired section of the Ethernet. The first device provides electrical power to operate the second device using the wired section of the Ethernet. One method for providing power over a data network may include determining availability of a power injector. A determination may be made whether a connected device is capable of receiving power over Ethernet. If the connected device is capable of receiving power over the Ethernet, electrical power may be provided from the power injector to the connected device.

12 Claims, 4 Drawing Sheets

(56) References Cited

U.S. PATENT DOCUMENTS

| | | |
|---|---|---|
| 2003/0014757 A1 | 1/2003 | Craven et al. |
| 2003/0035471 A1 | 2/2003 | Pitsoulakis |
| 2003/0217368 A1 | 11/2003 | Ramaswamy |
| 2004/0049321 A1 | 3/2004 | Lehr et al. |
| 2004/0068535 A1* | 4/2004 | Subbiah et al. ............. 709/200 |
| 2004/0107445 A1 | 6/2004 | Amit |
| 2004/0151289 A1 | 8/2004 | Phillips et al. |
| 2004/0264700 A1* | 12/2004 | Kirkland ...................... 380/270 |
| 2005/0022247 A1 | 1/2005 | Bitran et al. |
| 2005/0044431 A1* | 2/2005 | Lang et al. ................... 713/300 |
| 2005/0078690 A1 | 4/2005 | DeLangis |
| 2005/0089052 A1 | 4/2005 | Chen et al. |
| 2005/0097369 A1* | 5/2005 | Bowser et al. ............... 713/300 |
| 2005/0197094 A1* | 9/2005 | Darshan et al. ............. 455/402 |
| 2006/0049818 A1* | 3/2006 | Montgomery ................ 323/364 |
| 2006/0077888 A1 | 4/2006 | Karam et al. |
| 2006/0077891 A1 | 4/2006 | Smith et al. |
| 2006/0078093 A1 | 4/2006 | Karam et al. |
| 2006/0083186 A1* | 4/2006 | Handforth et al. ........... 370/310 |
| 2006/0100799 A1 | 5/2006 | Karam |
| 2006/0164098 A1* | 7/2006 | Su ................................ 324/534 |
| 2007/0019560 A1* | 1/2007 | Brewer et al. ............... 370/252 |
| 2007/0022474 A1* | 1/2007 | Rowett et al. .................. 726/11 |
| 2007/0057783 A1* | 3/2007 | Reller ........................... 340/538 |
| 2007/0075586 A1* | 4/2007 | Bogue ............................ 307/66 |
| 2007/0079151 A1 | 4/2007 | Connor et al. |
| 2007/0288771 A1 | 12/2007 | Robbins |
| 2008/0165781 A1 | 7/2008 | Voit et al. |
| 2008/0175260 A1* | 7/2008 | Hussain et al. ............... 370/419 |
| 2009/0003373 A1 | 1/2009 | Morrissey et al. |
| 2010/0218003 A1* | 8/2010 | Blaha et al. .................. 713/300 |

OTHER PUBLICATIONS

Carrier Sencse Multiple access collision detection access method and physical layer specification, Jun. 2003, IEEE, pp. 1-133.*

RCE filed May 24, 2010 in U.S. Appl. No. 11/824,087.

Final Action date mailed Jun. 7, 2010 in U.S. Appl. No. 11/824,261.

"Data-Over-Cable Service Specifications. Radio Frequency Interface Specification SP-RFI-104-980724," Interim Specification (Superseded); Cable Television Laboratories, Inc., 1997 (208 pages).

Non-Final Office Action date mailed Jan. 21, 2010 in U.S. Appl. No. 11/824,261.

Amendment Filed Mar. 4, 2010 to Non-Final Rejection date mailed Jan. 21, 2010 in U.S. Appl. No. 11/824,261.

Non-Final Office Action date mailed Sep. 17, 2009 in U.S. Appl. No. 11/824,087.

Response filed Dec. 9, 2009 to Non-Final Action date mailed Sep. 17, 2009 in U.S. Appl. No. 11/824,087.

Final Office Action date mailed Feb. 23, 2010 in U.S. Appl. No. 11/824,087.

U.S. Appl. No. 11/824,070; Final Rejection dated Dec. 14, 2009; 13 pages.

U.S. Appl. No. 11/824,070; Issue Notification dated May 28, 2014; 1 page.

U.S. Appl. No. 11/824,070; Non-Final Rejection dated Jul. 23, 2009; 16 pages.

U.S. Appl. No. 11/824,070; Non-Final Rejection dated Dec. 10, 2013; 19 pages.

U.S. Appl. No. 11/824,070; Notice of Allowance dated Feb. 11, 2014; 35 pages.

\* cited by examiner

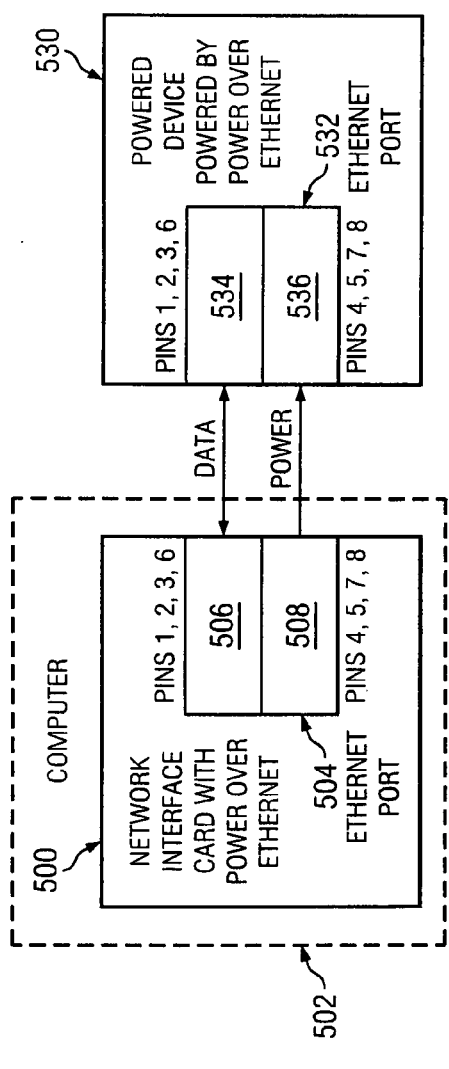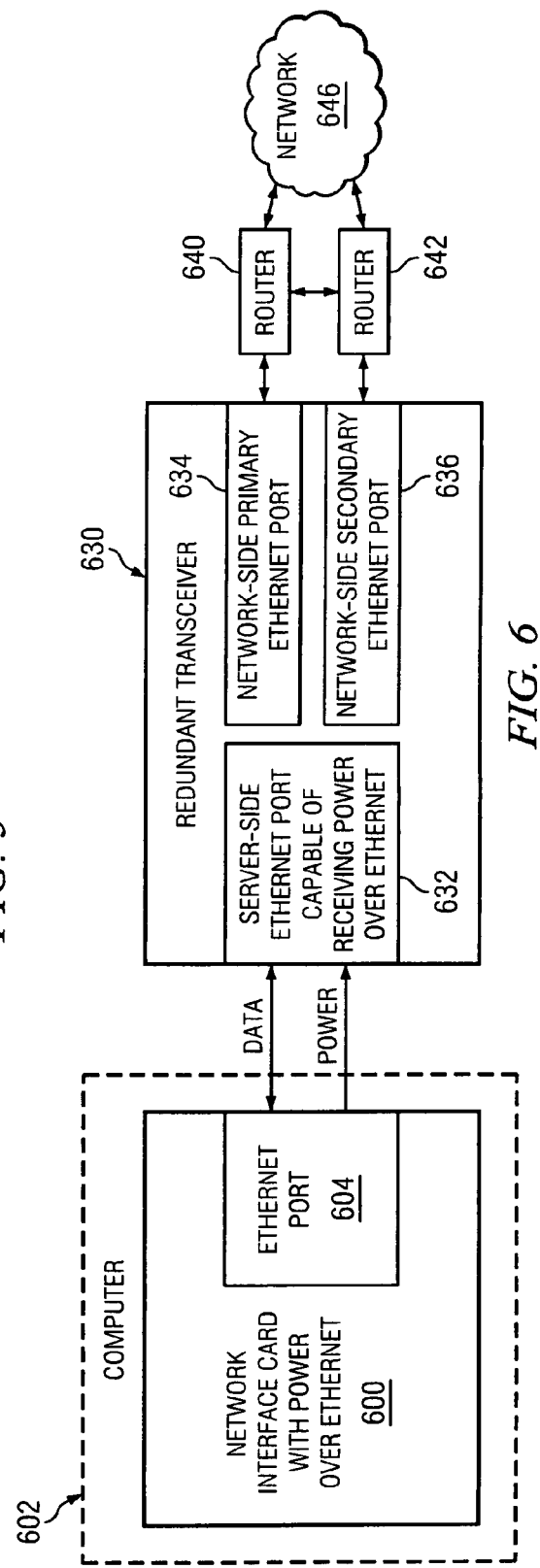

METHOD AND APPARATUS FOR PROVIDING POWER OVER A DATA NETWORK

BACKGROUND

1. Field of the Invention

The principles of the present invention relate generally to an improved data processing system, and in particular, to a system for providing power to data processing components. Still more particularly, the principles of the present invention relate to a computer implemented method, apparatus, and computer usable program code for providing power over a data network.

2. Description of the Related Art

Data processing systems are often connected with other devices and data processing systems using a data network. The data network provides the networked data processing systems and devices a communications medium over which data may be exchanged with each other.

Many types of wired and wireless networks are available for networking data processing systems and devices. Wired networks utilize physical wires that can carry electrical data signals for connecting data processing systems and devices to communicate over the network. Wireless networks generally utilize radio waves for connecting the data processing systems and devices to the network in a wireless manner.

Different network interface cards may be used in a data processing system for connecting to different networks. A "card" is a common term for a circuit board containing a circuit that can be connected with another circuit board. A card generally connects to and communicates with another card through "connectors" mounted on each card. Such connectors are designed to couple with each other such that circuits on each card can interoperate.

A connector is an element in a circuit that enables connecting the circuit to electrical wires and other circuits. A common example of a connector is the familiar clear plastic terminal at the end of a telephone cord that "clicks" into the wall outlet for a telephone connection. The clear plastic terminal at the end of the telephone cord is a male RJ11 connector. The wall outlet that the telephone cord clicks into is a female RJ11 connector. Another example of a connector is an RJ45 connector, which is a slightly larger terminal that looks much like the RJ11 connector and often is used as a terminal at the end of a networking cable. The male RJ45 connector connects with a female RJ45 connector that may be available in a wall outlet or at the end of another network cable.

A "network interface card" is a card that contains a circuit for providing a data processing system connectivity to a network. For example, an Ethernet card is a network interface card that provides data communications capabilities over Ethernet. "Ethernet" is a type of data network capable of operating at one or more data transfer speeds. As another example, a token ring card is a network interface card that provides data communications capabilities over a token ring network "Token ring" is a type of network that utilizes a token data for data communications amongst the networked data processing systems.

Other devices can also be present in a network. Such devices can be used in the network in conjunction with or separate from a data processing system. These devices may further contain network interface cards, or functional equivalents thereof, for providing the devices connectivity to the network.

The data processing systems and devices connected to a data network typically contain electronic components that consume electrical power for their operation. "Electrical power" is the electricity of certain type, voltage, and amperage used to power a given appliance, device, or application. Presently, such devices have a power source from which they derive the electrical power. For example, a network interface card in a data processing system can be connected to the data processing system's power supply.

As another example, a device, such as a router or a redundant transceiver, derives power from a power supply unit that is designed specifically for that device. A "power supply unit" is an electrical unit that connects to a device and provides electrical power to the device. For example, a power supply unit may be a power source, such as a battery or a power coupling, such as a transformer or an inverter, or a combination thereof.

A "router" is a device that provides data communications amongst the various data processing systems connected to the router, and between these connected data processing systems and a network. A "redundant transceiver" is a data transmitter and receiver that can connect to a data processing system on one end and several networks or devices, such as routers, on another end. Connected in this manner, a redundant transceiver provides redundant connections to the data processing system for ensuring continuous data communications should anyone of the several connected networks experience a failure.

Certain data processing environments, such as a data center, provide a power source to power the data processing systems. These data processing environments also provide separate power sources for powering other devices that operate in conjunction with the data processing systems. The power sources for powering the other devices is typically alternating current (AC) power provided by a conventional wall socket or available in rack-mount systems, as understood in the art. Using such power sources causes data centers to be vulnerable in the event of power outage, power surge, or other power disruptions as the device can fail even when the data processing systems continue to operate.

SUMMARY OF THE INVENTION

To reduce data center and other networked computer failure, the principles of the present invention provide for powering devices, such as redundant transceivers, using power supplied by a network interface card. In one embodiment, power over Ethernet is used to power a device using direct current (DC) power or AC power, thereby reducing problems resulting from interrupted or otherwise problematic AC power sources.

The illustrative embodiments provide a method, apparatus, and computer usable program code for providing power over Ethernet. The apparatus and method for providing power over Ethernet includes a first device that receives power from a computer. A second device may be in communication with the first device using a wired section of the Ethernet. The first device provides electrical power to operate the second device using the wired section of the Ethernet.

One method for providing power over a data network may include determining availability of a power injector. A determination may be made as to whether a connected device is capable of receiving power over Ethernet. If the connected device is capable of receiving power over the Ethernet, electrical power is provided from the power injector to the connected device.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 5 depicts a block diagram of a network interface card providing power over Ethernet in accordance with an illustrative embodiment;

FIG. 6 depicts a block diagram of a network interface card providing power over Ethernet to a redundant transceiver in accordance with an illustrative embodiment.

DETAILED DESCRIPTION OF THE DRAWINGS

Figure 1:
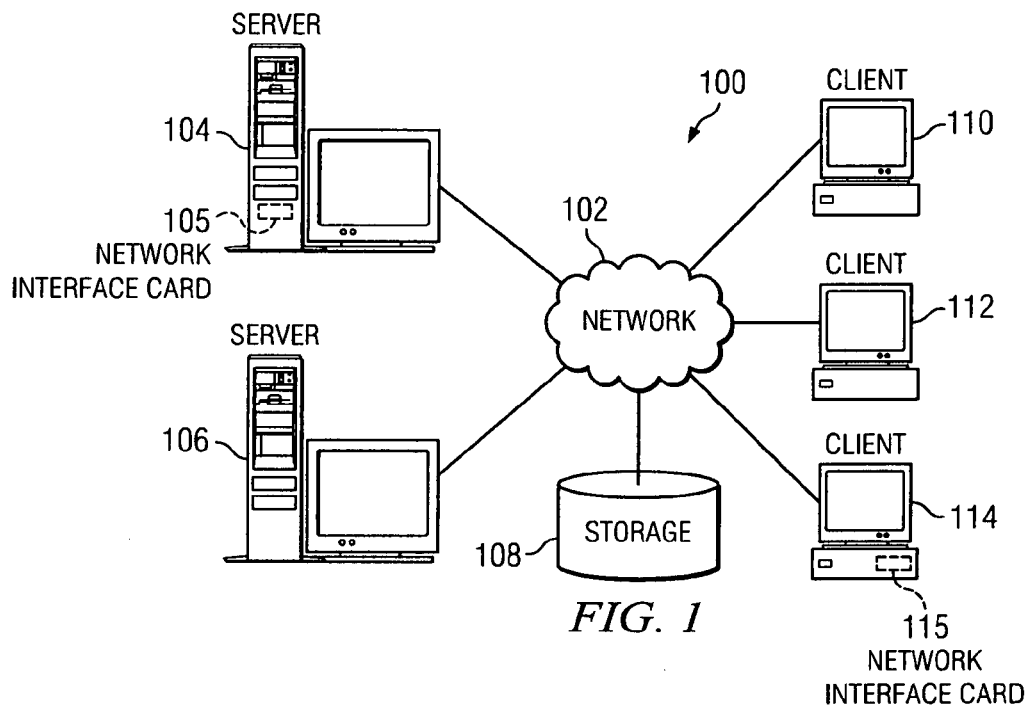
FIG. 1 depicts a pictorial representation of a network of data processing systems in which illustrative embodiments may be implemented.
Figure 2:
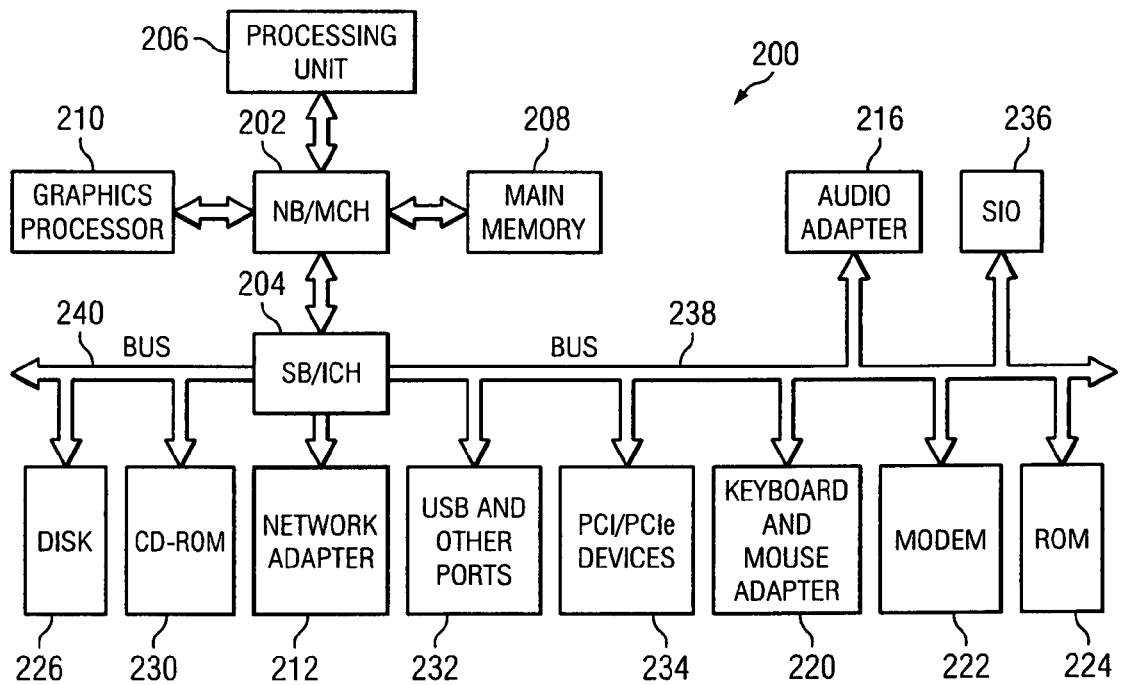
FIG. 2 depicts a block diagram of a data processing system in which illustrative embodiments may be implemented.

With reference to the figures, and in particular with reference to FIGS. 1 and 2, exemplary diagrams of data processing environments are provided in which illustrative embodiments may be implemented. FIGS. 1 and 2 are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a communications medium used to provide communications links between various devices and computers connected together within network data processing system 100. Network 102 may include connections, such as wire, wireless communication links, or fiber optic cables. Network 102 may be a data network.

In the depicted example, server 104 and server 106 connect to network 102 along with storage unit 108. Each server uses a network interface card for connecting to network 102. For example, server 104 is shown to include network interface card 105 for this purpose.

In addition, clients 110, 112, and 114 connect to network 102. Clients 110, 112, and 114 may be, for example, personal computers or network computers. Each client uses a network interface card for connecting to network 102. For example, client 114 is shown to include network interface card 115 for this purpose. Network interface cards 105 and 115 are examples of devices that can be used for implementing the illustrative embodiments described below for providing power over a data network.

In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH, for example, through an accelerated graphics port (AGP).

In the depicted example, local area network (LAN) adapter 212 is coupled to south bridge. Network adapters are also known as network interface cards. Network adapter 212 is analogous to network interface card 105 or 115 in FIG. 1. Network adapter 212 is an example of a device that may be used for implementing the illustrative embodiments described below for providing power over a data network.

I/O controller hub (SB/ICH) 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, network adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206, coordinates, and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A data processing system may connect to a data network using a device called a network interface card (NIC). Network 102 in FIG. 1 is an example of a data network. Network adapter 212 in FIG. 2 is an example of a network interface card. A network interface card provides the data processing system the capabilities for exchanging data over the data network.

Illustrative embodiments recognize that typically, power supply units powering devices are designed to match those specific devices. These power supply units operate on AC power. In contrast, generally, data processing systems, such as the server computers in a data center, operate on DC power. Consequently, the illustrative embodiments recognize that supplying electrical power to numerous devices creates power management issues in a data center and other data processing environments. For example, in a data center, the server computers may be coupled to a DC power supply bus that runs through the data center racks. However, if another device, such as a redundant transceiver, is used in conjunction with a server in a given rack the data center provides an AC power supply bus so that such device can be powered through its power supply unit.

The illustrative embodiments further recognize that wired networks, such as wired 10 or 100 or 1000 BaseT Ethernet, already have a wired connection between devices that is capable of carrying electrical power. If, for example, power could be provided from a single power supply bus in a data center, the data center could avoid several issues related to operating two power buses. For example, power from a single power supply bus can operate a server computer, and the server computer can then provide power over existing wires to other devices that would otherwise be connected to a second power supply bus.

Therefore, a method, apparatus, and computer usable program code for providing power over a data network would be useful. The illustrative embodiments describe such a method, apparatus and computer usable program code. The illustrative embodiments are described using wired 10/100/1000 BaseT Ethernet as an example. The illustrative embodiments may be implemented in other wired data networks in the manner described below.

Figure 3:
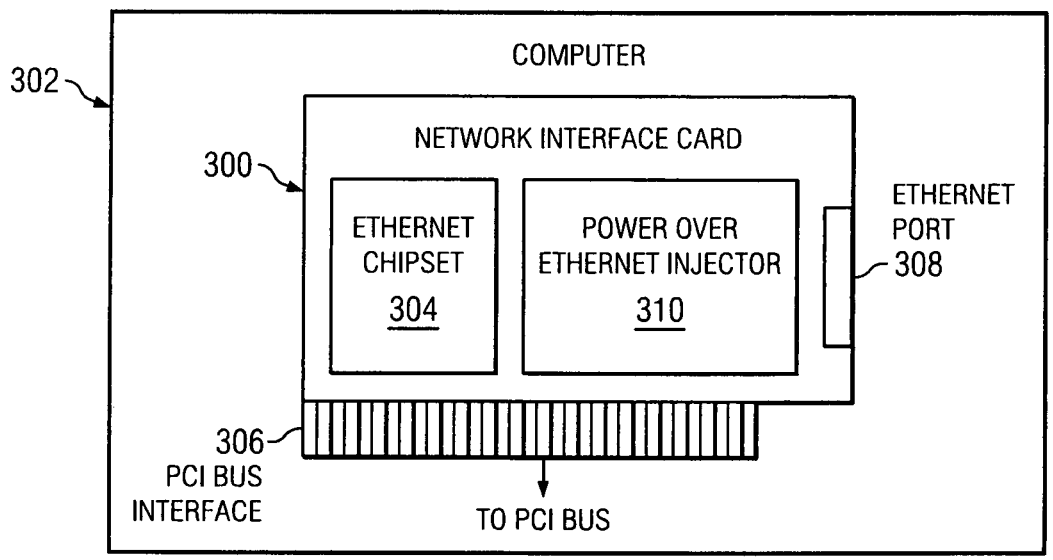
FIG. 3 depicts a block diagram of a power over Ethernet capable network interface card with power over Ethernet capability in accordance with an illustrative embodiment.

With reference to FIG. 3, this figure depicts a block diagram of a network interface card with power over Ethernet capability in accordance with an illustrative embodiment. Network interface card 300 is coupled to computer 302. Network interface card 300 can be implemented using network adapter 212 in FIG. 2. Computer 302 can be server 104 or client 114, for example, as shown in FIG. 1. Network interface card 300 is an example of a power source that provides the power over Ethernet. Other power sources that provide power over Ethernet are known in the art. For example, a router is known to power specific types of networking devices, such as a wireless access point but excluding redundant transceivers, over the data network connection with such devices. Computer 302 is not a router or a switch that is known in the art to provide power over Ethernet.

The network interface card 300 may be coupled to the computer 302 in a number of ways. For example, the network interface card 300 can be coupled to the computer 302 by connecting to a PCI bus of the computer 302 via a PCI card slot. As another example, the network interface card 300 may be coupled to the computer 302 using a cable connection to a port on the computer 302, such as to a USB port, a serial port, or an IEEE 1394 port. As another example, the network interface card 300 may couple to the computer 302 using a wireless network, such as a network based on IEEE 802.11b/g/n standard.

Network interface card 300 includes Ethernet chipset 304, for data communications over Ethernet. Network interface card 300 further includes PCI bus interface 306, which is a connector on network interface card 300 for connecting to a PCI bus in computer 302. PCI bus is a type of data bus, such as bus 238 in FIG. 2. Ethernet port 308 is a connector for connecting an Ethernet cable to network interface card 300.

As an example, an RJ45 female connector is commonly used as an Ethernet port on a network interface card RJ45 connector is described in detail in the description of FIG. 4 below. A male RJ45 connector on one end of an Ethernet cable may couple with the RJ45 connector on network interface card 300. Coupled in this manner, the RJ45 male and female connectors functionally connect the data processing system in which network interface card 300 is installed to a network. An RJ45 connector connects four pairs, or total of eight wires, in an Ethernet cable to an Ethernet port, such as Ethernet port 308.

Network interface card 300 may further include a power injector. A power injector is a power supply that provides electrical power of one or more type, voltage, and amperage.

Power over Ethernet (PoE) injector 310 is a type of power injector that is coupled with network interface card 300 to provide electrical power through Ethernet port 308. Several industry standards have been proposed for providing power over Ethernet, such as the IEEE 802.3at standard and the IEEE 802.3af standard. A common method for developing future standards is to base a new standard or new version of a standard on an existing standard. For example, a new standard may be derived from IEEE 802.3at standard or IEEE 802.3af standard.

A power injector, such as Power over Ethernet injector 310, may be coupled to a network interface card, such as network interface card 300, in a variety of ways. For example, the power injector may be installed or integrated on the network interface card. As another example, the power injector may be separate from the network interface card but the two may be connected using a suitable cable or a bus, thereby forming the coupling.

The following description continues with the example of Ethernet port 308 being a female RJ45 connector. Typically, even though an Ethernet port has connections to connect four pairs of wires using an RJ45 connector, not all four pairs of wires are used for the data communications over the Ethernet. As a result, some wires remain unused. "Unused wires" are wires that do not carry a data signal. Power over Ethernet injector 310 uses one or more pairs of connections in Ethernet port 308 for transmitting electrical power. Note that the one or more pairs of connections used for transmitting electrical power can be a pair of connections connecting to unused wires, a pair of connections connecting to wires used for data communications, or a combination thereof.

Connected in this manner in accordance with an illustrative embodiment, network interface card 300 may provide electrical power to a device connected to the other end of the Ethernet cable connected to Ethernet port 308. Power over Ethernet injector 310 can be configured to provide DC power or AC power as needed in a particular implementation of the illustrative embodiment. Parameters of power over Ethernet injector 310, such as the voltage and current, can be adjusted according to specific implementations without departing from the scope and spirit of the illustrative embodiment.

Additionally, an implementation may use the power supplied to a network interface card in place of a power injector, in effect eliminating the power injector component. Such implementations are contemplated within the scope and spirit of the illustrative embodiments.

Figure 4:
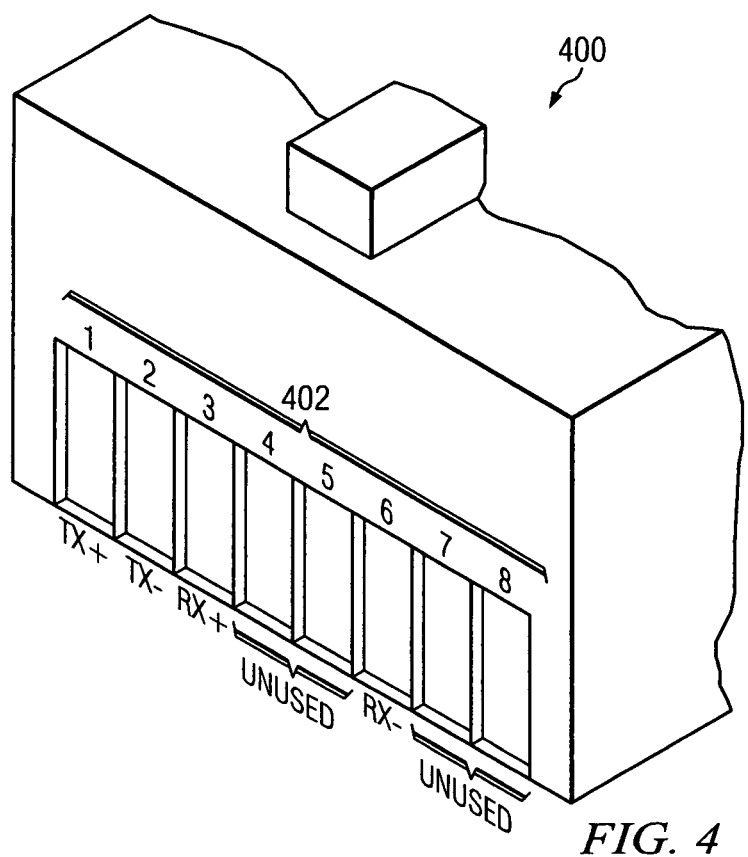
FIG. 4 depicts a block diagram of an RJ45 male connector presently used for Ethernet cable connections.

With reference to FIG. 4, this figure depicts a block diagram of an RJ45 male connector presently used for Ethernet cable connections. An Ethernet cable using connector 400 connects to an Ethernet port of a network interface card, such as Ethernet port 308 in network interface card 300 in FIG. 3.

Connector 400 includes eight pins 402, each pin connecting to a wire in the Ethernet cable. Connector 400 in this figure is a front view of a male RJ45 connector, and each pin in pins 402 is labeled 1-8 from left to right in accordance with this view. In a commonly used configuration for 10 BaseT or 100 BaseTX Ethernet connection, pins 1, 2, 3, and 6 are used for transmitting and receiving positive and negative voltage signals that correspond to data. Thus, in such a configuration, at least four pins connected to four wires remain unused.

Note that a data signal communicated over a wire in this manner is generally electrical in nature, but is different from electrical power. The data signal is different from the electrical power in that the electrical data signal has a small but sufficient voltage and/or current level to indicate a data value; whereas electrical power has voltage and/or current level that is typically larger than those of the data signal and provides sufficient energy for operating a device.

Pins 4, 5, 7, and 8 in pins 402 are depicted as unused. Note that this representation of an RJ45 connector in FIG. 4 and the specific pin usage are only shown for the simplicity of the illustration and are not intended to be limiting on the illustrative embodiments. Other connectors may be used without departing from the scope and spirit of the illustrative embodiments.

With reference now to FIG. 5, this figure depicts a block diagram of a network interface card providing power over Ethernet in accordance with an illustrative embodiment. Network interface card 500 is coupled to computer 502. Network interface card 500 can be implemented using network interface card 300 in FIG. 3, and computer 502 can be implemented using computer 302 in FIG. 3.

Ethernet port 504 is analogous to Ethernet port 308 in FIG. 3. Ethernet port 504 may be any suitable connector in male or female configuration. In this illustrative embodiment, Ethernet port 504 is depicted as a female RJ45 connector capable of receiving a male RJ45 connector, such as connector 400 in FIG. 4. For illustration, Ethernet port 504 is shown as divided into two sets of pins—pin numbers 1, 2, 3, and 6 depicted as pins 506; and pin numbers 4, 5, 7, and 8 depicted as pins 508. In correspondence with the description of pin numbers 1-8 in pins 402 in FIG. 4, pins 506 carry the data signals, and pins 508 are unused.

Powered device 530 is a device on a data network and uses electrical power from a power supply unit in order to operate. A powered device may or may not be capable of receiving electrical power over its connection to the data network. The powered device may indicate whether the powered device is capable of receiving electrical power over the data network in any of several ways that may be suitable in a particular implementation. For example, a powered device can indicate this capability by using one of the pins of the RJ45 connector to carry a data signal that is indicative of this capability. As another example, a powered device can indicate this capability through a set of configuration parameters that are shared with other devices. Other ways of communicating whether a powered device is capable of receiving electrical power over the data network will be readily conceivable from this disclosure.

Powered device 530 is capable of receiving data as well as electrical power over Ethernet using Ethernet port 532. In this illustrative embodiment, Ethernet port 532 is depicted as a female RJ45 that can be coupled with Ethernet port 504 using an Ethernet cable with male RJ45 connectors on each end. Corresponding to pins 506, pins 534 include pin numbers 1, 2, 3, and 6 for carrying data. Corresponding to pins 508, pins 536 include pin numbers 4, 5, 7, and 8, which are unused.

Powered device 530 may be electrically coupled to network interface card 500. A powered device may be electrically coupled to another device, such as a network interface card, in a number of ways. For example, the powered device may be connected to the other device using a suitable cable. As another example, the powered device may be on a common bus with the other device within a computer's architecture. Other ways of coupling a powered device to another device will be apparent from the description of the illustrative embodiments.

In accordance with the illustrative embodiment, network interface card 500 establishes data communications with powered device 530 using pins 506 and 534 on the respective devices. Network interface card 500 provides power to powered device 530 using one or more pairs of unused pins in pins 508 and pins 536. For example, pin number 4 on network interface card 500 and powered device 530 may carry a positive DC voltage and pin number 5 on them may be grounded. As another example, pin numbers 4 and 5 may carry the positive DC voltage and pin numbers 7 and 8 may be grounded. As another example, pins that carry data signals may be simultaneously used to carry power in a way that the electrical power and the data signal can be separated at the device that receives the electrical power and the data signal together from the data network.

These examples are described only for the clarity of the illustration and are not intended to be limiting on the illustrative embodiments. Other pin configurations are easily conceivable from this description, and are contemplated within the scope of the illustrative embodiments.

With reference now to FIG. 6, this figure depicts a block diagram of a network interface card providing power over Ethernet to a redundant transceiver in accordance with an illustrative embodiment. Network interface card 600 is connected to computer 602. Network interface card 600 can be implemented using network interface card 500 in FIG. 5, and computer 602 can be implemented using computer 502 in FIG. 5.

Ethernet port 604 is analogous to Ethernet port 504 in FIG. 5. As in FIG. 5, Ethernet port 604 may be any suitable connector in male or female configuration. In this illustrative embodiment, Ethernet port 604 is depicted as a female RJ45 connector capable of receiving a male RJ45 connector, such as connector 400 in FIG. 4.

Redundant transceiver 630 is a redundant transceiver as described above, and is one example of powered device 530 in FIG. 5. A redundant transceiver connects to a computer, such as server 104 in FIG. 1, using a connector on one logical side of the redundant transceiver. This side is called the "server-side" of the redundant transceiver. The redundant transceiver connects to several networks or devices using several connectors on the other logical side of the redundant transceiver. This side is called the "network-side" of the redundant transceiver.

Redundant transceiver 630 is capable of exchanging data as well as receiving electrical power over Ethernet using server side Ethernet port 632. Redundant transceiver 630 is depicted as being connected to two networks using network side primary Ethernet port 634 and network side secondary Ethernet port 636. Redundant transceiver 630 is depicted as capable of connecting to two routers 640 and 642, which connect to network 646. In a specific implementation, a redundant transceiver may connect to two or more devices or networks.

Note that server side Ethernet port 632, network side primary Ethernet port 634, and network side secondary Ethernet port 636 need not be Ethernet ports and may be any suitable connector in male or female configuration. In this illustrative embodiment, each of these ports is depicted as a female RJ45 connector.

Network interface card 600 exchanges data and provides electrical power to redundant transceiver 630, using Ethernet port 604 in a manner analogous to the manner described with respect to network interface card 500 in FIG. 5. Redundant transceiver 630 exchanges data and receives electrical power using server side Ethernet port 632 in a manner analogous to the manner described with respect to powered device 530 in FIG. 5.

Figure 7:
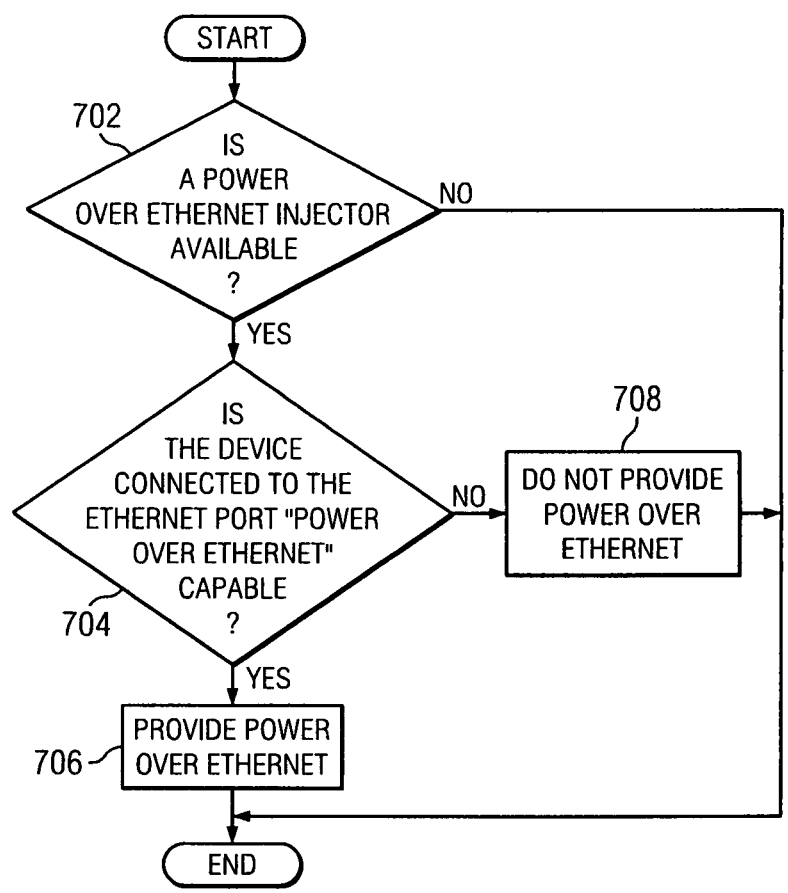
FIG. 7 depicts a flowchart of a process of providing power over Ethernet in accordance with an illustrative embodiment.

With reference to FIG. 7, this figure depicts a flowchart of a process of providing power over Ethernet in accordance with an illustrative embodiment. The process is illustrated with respect to providing power over Ethernet only but may be used for providing power over a type of network other than Ethernet.

Process 700 may be implemented in network interface card 600 in FIG. 6, in computer 602 in FIG. 6, or in a combination thereof. Process 700 begins by determining whether a power over Ethernet injector is available (step 702). If a power over Ethernet injector is available ("Yes" path of step 702), the process determines whether a device connected to the Ethernet port is capable of receiving power over Ethernet (step 704). If a power over Ethernet injector is not available ("No" path of step 702), the process terminates and power is not provided over Ethernet. Note that step 702 is optional. A specific implementation of process 700 may omit step 702 and proceed as if the "Yes" path of above step 702 is followed.

If the process determines that the device connected to the Ethernet port is capable of receiving power over Ethernet ("Yes" path of step 704), the process provides power over Ethernet (Step 706). The process ends thereafter. Note that step 704 may be made optional. A specific implementation of process 700 may omit step 704 and proceed as if the "Yes" path of above step 704 is followed.

If, the device connected to the Ethernet port is not capable of receiving power over Ethernet ("No" path of step 704), the power is not provided over Ethernet (Step 708). The process ends thereafter.

Thus, in the illustrative embodiments described above, a computer implemented method, apparatus, and computer program product provide for providing power over a data network. Using Ethernet as an exemplary network for providing power over a data network a network interface card is modified in accordance with the illustrative embodiments. The network interface card provides power to a powered device over the data network.

The method, apparatus, and computer usable program code for providing power over a data network are useful, for example, in a data center environment. In a typical data center, a rack may contain components and servers requiring different types of power supplies. Presently, data centers run DC power to a rack to power the servers, and AC power to the rack to power other powered devices, such as redundant transceivers.

Using the illustrative embodiments, a data center can eliminate AC power supply from a rack by powering the powered devices using power over the data network, such as Ethernet, in the manner described above. In eliminating AC power supply from a rack the data center can simplify the power grid within the data center by having only one type of power, for example DC power. Simplification of the power grid inside a data center simplifies power management, reduces backup power equipment, reduces maintenance issues, and reduces accidental power source mismatch.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A system for providing power over Ethernet, the system comprising:
    a removable network interface card comprising an Ethernet chipset and a PCI bus interface, said removable network interface card being removably attached to a system bus of a computer via a PCI card slot, the network interface card configured to receive direct current (DC) power from the computer to power the Ethernet chipset;
    a power over Ethernet injector which is physically separate from the removable network interface card and connected to the removable network interface card with a cable; and
    a second device in communication with the Ethernet chipset of the network interface card using a wired section of the Ethernet, wherein the second device indicates to the network interface card its ability to receive power over the wired section by transmitting a data signal over the wired section to the computer through the Ethernet chipset of the network interface card to indicate this capability, and in response to receiving the data signal the removable network interface card providing electrical power from the power over Ethernet injector through the network interface card to operate the second device using the wired section of the Ethernet.

2. The system of claim 1, wherein the network interface card complies with at least one of IEEE 802.3at standard and IEEE 802.3af standard.

3. The system of claim 1, wherein the network interface card provides the electrical power using an unused wire in the wired section of the Ethernet.

4. The system of claim 1, wherein the network interface card provides the electrical power using a wire carrying a data signal in the wired section of the Ethernet.

5. The system of claim 1, wherein the network interface card provides all the electrical power to operate the second device using the wired section of the Ethernet.

6. A method for providing power over Ethernet, the method comprising:
    coupling a removable network interface card comprising an Ethernet chipset, and a PCI bus interface to a PCI card slot of a computer to receive direct current (DC) power from the computer to power the Ethernet chipset;
    providing a power over Ethernet injector which is physically separate from the removable network interface card;
    connecting the power over Ethernet injector to the removable network interface card with a cable;
    connecting a second device to the removable network interface card, wherein the second device is placed into communication with the computer through the Ethernet chipset of the removable network interface card using a wired section of the Ethernet, and wherein the second device indicates to the computer through the Ethernet chipset of the network interface card the ability to receive power over the wired section;
    powering the Ethernet chipset with the DC power from the computer; and
    powering the second device with power transmitted to the second device from the power over Ethernet injector through the removable network interface card and over a wired section of the Ethernet.

7. The method of claim 6, wherein the computer is not a router or a switch that provides power over Ethernet.

8. The method of claim 6, wherein the network interface card with at least one of IEEE 802.3at standard and IEEE 802.3af standard.

9. The method of claim 6, wherein the network interface card provides the electrical power using an unused wire in the wired section of the Ethernet.

10. The method of claim 6, wherein the network interface card provides the electrical power using a wire carrying a data signal in the wired section of the Ethernet.

11. The method of claim 6, wherein the network interface card provides all the electrical power to operate the second device using the wired section of the Ethernet.

12. The system of claim 1, wherein the second device is a redundant transceiver that provides redundant connections to the computer for ensuring continuous data communications.

* * * * *